United States Patent
Woo et al.

(10) Patent No.: US 10,031,626 B2
(45) Date of Patent: Jul. 24, 2018

(54) DISPLAY DEVICE WITH INTEGRATED TOUCH SCREEN

(71) Applicant: LG Display Co., Ltd., Seoul (KR)

(72) Inventors: Yoon-Hwan Woo, Seoul (KR); Hee-Sun Shin, Paju-si (KR)

(73) Assignee: LG Display Co., Ltd. (KR)

( * ) Notice: Subject to any disclaimer, the term of this patent is extended or adjusted under 35 U.S.C. 154(b) by 95 days.

(21) Appl. No.: 14/478,592

(22) Filed: Sep. 5, 2014

(65) Prior Publication Data

US 2015/0130753 A1 May 14, 2015

(30) Foreign Application Priority Data

Nov. 8, 2013 (KR) .................. 10-2013-0135610

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0416* (2013.01)

(58) Field of Classification Search
CPC .......... G06F 3/041; G06F 3/045; G06F 3/042; G06K 11/06; G08C 21/00
See application file for complete search history.

(56) References Cited

U.S. PATENT DOCUMENTS

| | | | |
|---|---|---|---|
| 2010/0007621 A1* | 1/2010 | Kang | G06F 3/044 345/173 |
| 2010/0033443 A1* | 2/2010 | Hashimoto | G06F 3/0418 345/173 |
| 2011/0007030 A1 | 1/2011 | Mo et al. | |
| 2011/0025640 A1 | 2/2011 | Lin et al. | |
| 2012/0062511 A1* | 3/2012 | Ishizaki | G06F 3/044 345/174 |
| 2012/0169655 A1* | 7/2012 | Chang | G06F 3/0418 345/174 |
| 2013/0147724 A1* | 6/2013 | Hwang | G06F 3/0412 345/173 |
| 2013/0215075 A1* | 8/2013 | Lee | G06F 3/044 345/174 |

(Continued)

FOREIGN PATENT DOCUMENTS

| CN | 101943975 A | 1/2011 |
|---|---|---|
| CN | 202003341 | 10/2011 |

(Continued)

OTHER PUBLICATIONS

Korea Intellectual Property Office, Office Action, Korean Patent Application No. 10-2013-0135610, dated Jun. 30, 2016, six pages [with concise relevance in English].

(Continued)

*Primary Examiner* — Pegeman Karimi
(74) *Attorney, Agent, or Firm* — Fenwick & West LLP

(57) ABSTRACT

A display device with an integrated touch screen includes a panel including m (m is a natural number) electrodes and m lines; a display driver IC applying a common voltage to the m electrodes; and a touch IC generating a touch scan signal to apply the touch scan signal to the m electrodes and receiving touch sensing signals according to the touch scan signal to detect a location of a touch input on the panel, wherein at least one of the m electrodes includes touch electrode portions and non-touch electrode portions.

8 Claims, 15 Drawing Sheets

(56) References Cited

U.S. PATENT DOCUMENTS

| | | | | |
|---|---|---|---|---|
| 2013/0342479 A1* | 12/2013 | Pyo | ............................ | G09G 3/00 345/173 |
| 2014/0049486 A1* | 2/2014 | Kim | ........................ | G06F 3/041 345/173 |
| 2014/0132526 A1* | 5/2014 | Lee | ........................ | G06F 3/0412 345/173 |
| 2014/0253499 A1* | 9/2014 | Lee | ........................... | G06F 3/044 345/174 |
| 2014/0354572 A1* | 12/2014 | Zhao | ..................... | G06F 3/0416 345/173 |

FOREIGN PATENT DOCUMENTS

| | | |
|---|---|---|
| CN | 102760017 | 10/2012 |
| CN | 202948433 | 5/2013 |
| CN | 103164076 A | 6/2013 |
| CN | 103258492 A | 8/2013 |
| CN | 203178998 | 9/2013 |
| KR | 10-2013-0013070 A | 2/2013 |
| KR | 10-2013-0072591 A | 7/2013 |
| KR | 10-2013-0095461 A | 8/2013 |
| KR | 10-2013-0121713 A | 11/2013 |

OTHER PUBLICATIONS

State Intellectual Property Office of the People's Republic of China, First Office Action, Chinese Patent Application No. 201410503185.8, dated Feb. 21, 2017, seventeen pages.

$2^{nd}$ Office Action for Chinese Patent Application No. CN 201410503185.8, dated Oct. 11, 2017, 19 Pages (With English Translation).

\* cited by examiner

DISPLAY DEVICE WITH INTEGRATED TOUCH SCREEN

CROSS-REFERENCE TO RELATED APPLICATION

The present application claims priority to Korean Patent Application No. 10-2013-0135610 filed on Nov. 8, 2013, which is hereby incorporated by reference in their entirety.

BACKGROUND

Field of the Disclosure

The present disclosure relates to a display device, and more particularly, to a display device with an integrated touch screen.

Discussion of the Related Art

A touch screen is an input device installed in an image display device implemented using technology such as a liquid crystal display (LCD), a field emission display (FED), a plasma display panel (PDP), an electroluminescence device (EL), an eletrophoretic display (EPD), etc., to allow a user to input predetermined information by pressing (or touching) a touch sensor in the touch screen while viewing the image display device.

Touch screens are classified into three types depending on a structure of a touch screen installed in a display device: an add-on type, an on-cell type and an in-cell type. An add-on type touch screen is manufactured separately from a display device and is attached on an upper substrate of the display device. An on-cell type touch screen comprises elements directly formed on an upper substrate of a display device. An in-cell type touch screen is built in a display device such that the display device has a thin thickness and improved durability.

A display device with an add-on type touch screen has disadvantages of a thick thickness and low visibility from low brightness. Although it has a thinner thickness than the display device with an add-on type touch screen, a display device with an on-cell type touch screen has disadvantages of increased total thickness, manufacturing processes and manufacturing costs because of driving electrodes, sensing electrodes, and an insulating there between for the touch screen.

On the other hand, a display device with an in-cell type touch screen, which may be referred to as a display device with an integrated touch screen, is able to improve durability and have a thin thickness, thereby solving the problems of the display device with the add-on type touch screen and the display device with the on-cell type touch screen. The display device with an in-cell type touch screen may again be divided into two categories: an optical type and a capacitive type. The capacitive type may be categorized into self capacitance type and mutual capacitive type.

A display device with a mutual capacitance in-cell type touch screen includes a common electrode divided into driving electrodes and sensing electrodes such that mutual capacitance is generated between the driving electrodes and the sensing electrodes and measures a change in the mutual capacitance due to a touch of a user, thereby detecting the touch. A display device with a self capacitance in-cell type touch screen includes a common electrode divided into a plurality of parts such that the plurality of parts are used as touch electrodes and capacitance is generated between the touch electrodes and an input of a user, and a change in the capacitance due to a touch of the user is measured, thereby detecting the touch.

In the display device with a self capacitance in-cell type touch screen according to the related art, each touch electrode formed by dividing the common electrode and includes blocks generates capacitance with the touch electrodes and the lines adjacent thereto, and the initial capacitance varies depending on the number of neighboring touch electrodes, an overlapping area of the touch electrode with the lines, and so on.

Particularly, the initial capacitance increases as the touch electrode increase, the number of neighboring touch electrodes increases or the overlapping area of the touch electrode with the lines increases. In this case, the change in the capacitance due to the touch of the user is decreased, which in turn decreases the touch sensitivity.

In addition, in the self capacitance in-cell type touch screen, the number of neighboring touch electrodes and the overlapping between the touch electrode and the lines are larger than those of the mutual capacitance in-cell type touch screen. The initial capacitance in the self capacitance in-cell type touch screen is larger than those of the mutual capacitance in-cell type touch screen.

SUMMARY OF THE INVENTION

Embodiments relate to a display device with an integrated touch screen. The display device includes a panel, a display deriver integrated circuit (IC) and a touch IC. The panel includes m number of electrodes and m number of lines, where m is a natural number. The display driver IC applies a common voltage to the m number of electrodes. The touch IC generates a touch scan signal to apply the touch scan signal to the m number of electrodes and receives touch sensing signals according to the touch scan signal to detect a location of a touch input on the panel. At least one of the m number of electrodes includes touch electrode portions and non-touch electrode portions.

In one or more embodiments, the panel is divided into a display area and a non-display area. The m number of electrodes are formed in the display area, and the display driver IC is disposed in the non-display area.

In one or more embodiments, the touch IC is disposed in the non-display area or is formed in the display driver IC.

In one or more embodiments, the display driver IC applies the common voltage to the m number of electrodes when the panel is driven in a display driving mode, and the touch IC applies the touch scan signal to the m number of electrodes when the panel is driven in a touch driving mode.

In one or more embodiments, the display driver IC includes a common voltage generating unit, a synchronizing signal generation unit, and a switching unit. The common voltage generation unit generates the common voltage. The synchronizing signal generation unit generates synchronizing signals placing the panel in the display driving mode or the touch driving mode. The switching unit connects the common voltage generation unit and the m number of electrodes or connects the touch IC and the m number of electrodes depending on the synchronizing signals.

In one or more embodiments, the touch IC includes a touch scan signal generation unit, and a touch sensing unit. The touch scan signal generation unit generates the touch scan signal. The touch sensing unit receives the touch sensing signals from the m number of electrodes in response to applying the touch scan signal and detecting the location of the touch input on the panel.

In one or more embodiments, the touch IC provides the touch scan signal and receives the touch sensing signals through the display driver IC.

In one or more embodiments, the non-touch electrodes portions are openings where an electrode pattern is not formed and the touch scan signal is not applied.

In one or more embodiments, the openings are rectangular or circular in shape.

In one or more embodiments, the openings are connected to each other.

In one or more embodiments, dummy electrodes not applied with the touch scan signal are formed in the non-touch electrode portions.

In one or more embodiments, the dummy electrodes are rectangular or circular in shape.

In one or more embodiments, the dummy electrodes are connected to each other.

In one or more embodiments, at least one of the m number of electrodes has a mesh pattern shape.

Embodiments also relate to a display device with a touch screen. The display device includes a panel, and an integrated circuit. The panel is formed with an array of pixels for generating images, a touch surface to receive a touch from a user, a plurality of conductive lines, and a plurality of electrodes. Each of the electrodes has a conductive area that is electrically connected to one of the conductive lines. The conductive area of each of the electrodes is smaller than an entire area of each of the electrodes. The integrated circuit provides common voltage signals for operating the pixels to the pixels via the conductive lines and the electrodes in a display driving mode. The integrated circuit also provides touch scan signals for detecting a location of the touch on the touch surface to the electrodes via the conductive lines in a touch driving mode.

In one or more embodiments, the electrodes are formed as an array on a display area of the panel and the integrated circuit is attached to a non-display area of the panel.

In one or more embodiments, the integrated circuit includes a synchronizing signal generation unit, a common voltage generation unit and a switching unit. The synchronizing signal generation unit generates a synchronizing signal indicating either the display driving mode or the touch driving mode. The common voltage generation unit generates the common voltage signals. The switching unit is coupled to the common voltage generation unit and a touch scan circuit that generates the touch scan signals. The switching unit transmits the common voltage signals or the touch scan signals to the conductive lines according to the synchronizing signal.

In one or more embodiments, a touch scan circuit is provided. The touch scan circuit includes a touch scan signal generation unit generating the touch scan signals, and a touch sensing unit receiving the touch sensing signals from the electrodes in response to applying the touch scan signals and detecting the location of the touch input on the panel.

In one or more embodiments, the touch scan circuit provides the touch scan signal and receives the touch sensing signals through the integrated circuit.

In one or more embodiments, each of the electrodes includes openings in which conductive material for transmitting the touch scan signals is not formed.

In one or more embodiments, each of the openings is rectangular or circular in shape.

In one or more embodiments, each of the electrodes includes bridges connecting each of the openings.

In one or more embodiments, the conductive area includes edge lines surrounding the electrode, and a plurality of sub-conductive areas enclosed within the edge lines.

In one or more embodiments, each of the sub-conductive areas is rectangular.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment, an example of which is illustrated in the accompanying drawings.

A liquid crystal display (LCD) device described herein may be used for a panel of a display device with an in-cell type touch screen, which may be referred to as a display device with an integrated touch screen. Various flat panel display (FPD) devices such as a field emission display (FED) device, a plasma display panel (PDP) device, an electroluminescence (EL) device including an inorganic light emitting diode device or an organic light emitting diode (OLED) device, or an electrophoresis display (EPD) device may be used for the panel of the display device with an in-cell type touch screen according to the present invention. The structure of a liquid crystal display device will be described briefly for the sake of simplification.

Figure 1:
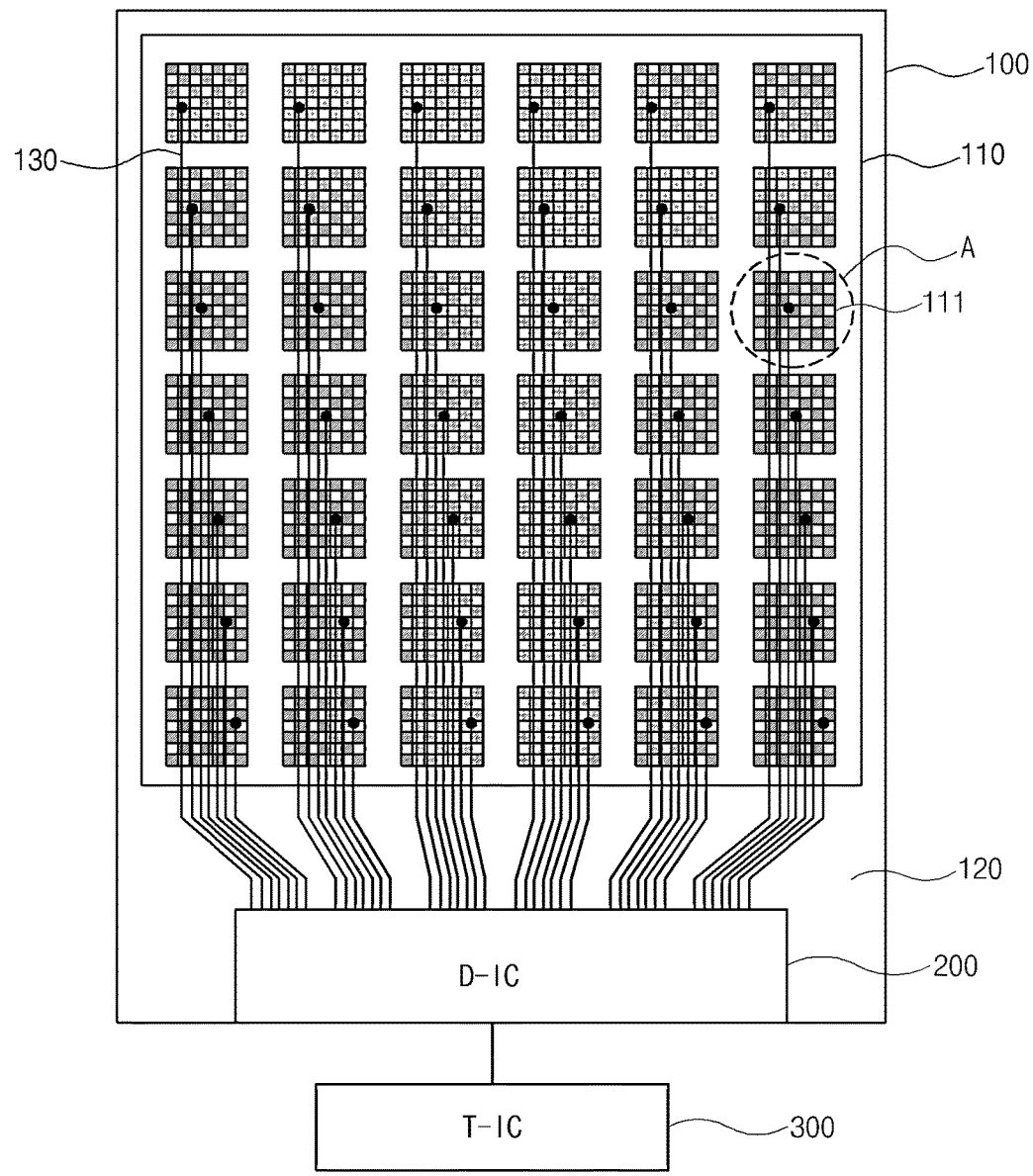
FIG. 1 is a view illustrating a display device with an in-cell type touch screen according to an embodiment.

FIG. 1 is a view illustrating a display device with an in-cell type touch screen according to an embodiment. The display device of FIG. 1 of an in-cell type touch screen includes a panel 100 and a touch IC 300.

The panel 100 includes a display area 110 and a non-display area 120. A touch screen (not shown) is integrated with the panel 100 in the display area 110. A display driver IC 200 is disposed in the non-display area 120. The touch screen detects a touch location of a user and, specifically, is a self capacitance type touch screen in which a frame is divided into periods and a display driving mode and a touch driving mode are performed during the divided periods, respectively. The frame described herein may be defined by a time period between two vertical synchronization signals.

The panel 100 may include two substrates and a liquid crystal layer interposed between the substrates. Although not shown in the figures, a plurality of gate lines, a plurality of data lines crossing the gate lines, a plurality of thin film transistors (TFTs) formed at crossing portions of the gate lines and the data lines, and a plurality of pixel electrodes connected to the TFTs may be formed on the lower substrate of the panel 100. A plurality of pixels defined by intersecting of the gate lines and the data lines may be arranged on the lower substrate of the panel 100 in a matrix shape.

In addition, the panel 100 includes m electrodes 111 (m is a natural number) and m lines 130. "m" number of electrodes 111 (hereinafter referred to as "the m electrodes 111") are formed in the display area 110 of the panel 100 and overlap with the pixel electrodes. That is, electrodes 111 do not overlap with "m" number of pixels, respectively, and each of the m electrodes 111 overlaps with the pixels.

During a display driving period, the electrodes 111 function as a common electrode for moving liquid crystal molecules with a pixel electrode formed in each pixel. During a touch driving period, the same electrodes 111 function as a touch electrode for detecting a touch location by applying a touch scan signal from the touch IC 300.

Each of the electrodes 111 is divided into touch electrode portions (also referred to herein as "sub-conductive areas") and non-touch electrode portions. The touch electrode portions described herein refer to portions of the electrodes 111 used for detecting a touch location based on the touch scan signal. The non-touch electrode portions refer to portions of electrodes 111 that do not receive the touch scan signal, and hence, these portions are not used for detecting the touch location.

In the present invention, since each electrode 111 includes the non-touch electrode portions, initial capacitance of the electrode 111 is decreased. Thus, a variation between capacitances of the electrode 111 before and after a touch input of the user is increased, thereby increasing the touch sensitivity of the touch electrode. The structure of the electrode of the display device with an in-cell type touch screen according to the embodiment of the present invention is described below in detail later with reference to FIGS. 3A to 8B, which are enlarged views of area "A" of FIG. 1.

Figure 2:
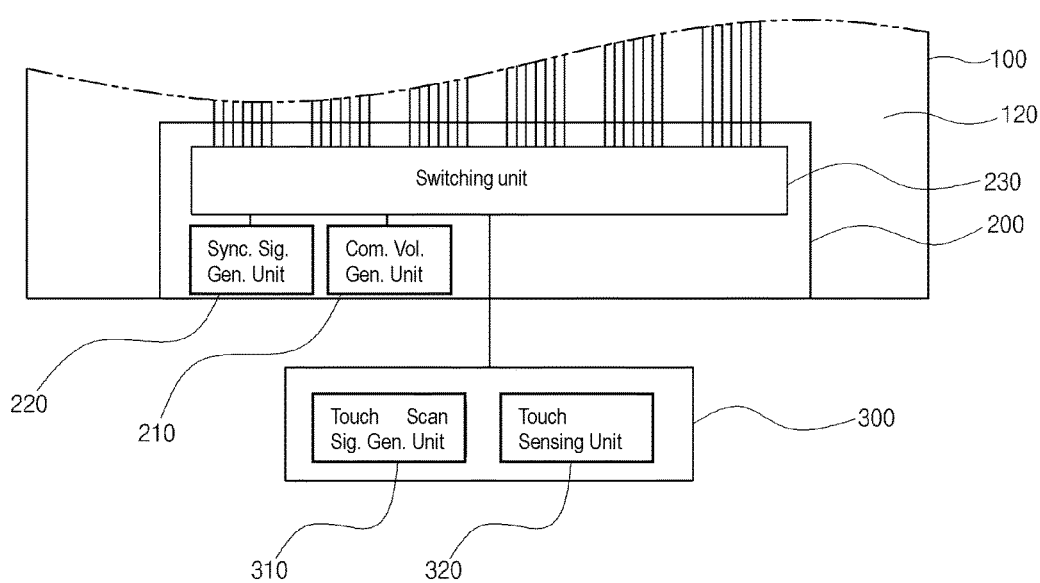
FIG. 2 is a view illustrating detailed connection relation between a display driver integrated circuit (IC) and a touch IC according to an embodiment.

FIG. 2 is a view illustrating detailed connection relation between a display driver integrated circuit (IC) and a touch IC according to an embodiment. "m" number of lines 130 (hereinafter referred to as "the m lines 130") of the panel 100 connect the m electrodes 111 with the display driver IC 200, respectively. For example, as shown in FIG. 1, the m lines 130 connect the m electrodes 111 with the display driver IC 200 such that a common voltage and a touch scan signal outputted from the display driver IC 200 are applied to the m electrodes 111 through the m lines 130.

The display driver IC 200 applies the common voltage or the touch scan signal to the m electrodes 111 through the m lines 130 when the panel 100 is in the display driving mode. More particularly, if the panel 100 is in a display driving mode, the display driver IC 200 applies the common voltage to the m electrodes 111 through the m lines 130. If the panel 100 is in a touch driving mode, the display driver IC 200 applies the touch scan signal to the m electrodes 111 through the m lines 130.

Particularly, in the touch driving mode, the display driver IC 200 may divide the m electrodes 111 of the panel 100 into a plurality of groups and sequentially apply the touch scan signal to the groups. That is, channels of the touch IC 300 should correspond to the electrodes 111, respectively. However, when the number of the channels of the touch IC 300 is fewer than the number of the electrodes 111, the electrodes 111 may be divided into groups, and the scan signal may be applied to the groups. In this case, a multiplexer may be formed inside or outside the display driver IC 200 and connect the channels of the touch IC and the electrodes 111.

For instance, when the number of channels of the touch IC 300 is m/2 and the number of electrodes 111 of the panel 100 are m, the common voltage may be applied to the m electrodes 111 of the panel 100 during the display driving mode. The touch scan signal may be sequentially applied to first and second groups, each of which is defined by dividing the m electrodes 111 into two groups, each group including m/2 electrodes 111.

As shown in FIG. 2, the display driver IC 200 may include a common voltage generation unit 210, a synchronizing signal generation unit 220 and a switching unit 230 to drive the m electrodes 111 either as the common electrodes or the touch electrodes.

The common voltage generation unit 210 generates the common voltage (Vcom) and applies the common voltage to the switching unit 230. That is, in the display driving mode of the panel 100, the common voltage generation unit 210 generates the common voltage provided to the m electrodes 111 for outputting an image and applies the common voltage to the switching unit 230.

The synchronizing signal generation unit 220 generates a synchronizing signal instructing the panel 100 to be driven in the display driving mode or the touch driving mode. For example, the synchronizing signal generation unit 220 generates (i) a synchronizing signal instructing the common voltage (Vcom) generated by the common voltage generation unit 210 to be applied to the m electrodes 111 through the switching unit 230 in the display driving mode or (ii) a synchronizing signal instructing the touch scan signal generated by the touch IC 300 to be applied to the m electrodes 111 in the touch driving mode.

The switching unit 230 connects the common voltage generation unit 210 to the m electrodes 111 or connects the touch IC 300 to the m electrodes 111 according to the synchronizing signals. For example, the switching unit 230 may connect the common voltage generation unit 210 or the touch IC 300 to the m electrodes 111. When the synchronizing signal of the synchronizing signal generation unit 220 instructs the panel 100 to be driven in the display driving mode, the switching unit 230 connects the common voltage generation unit 210 to the m electrodes 111, and when the synchronizing signal of the synchronizing signal generation unit 220 instructs the panel 100 to be driven in the touch driving mode, the switching unit 230 connects the touch IC 300 to the m electrodes 111.

The touch IC 300 generates the touch scan signal and applies the touch scan signal to the m electrodes 111. Then, the touch IC 300 receives the touch sensing signals from the m electrodes 111 according to the touch scan signal and detects the location of the touch input on the panel 100. For example, as shown in FIG. 2, the touch IC 300 may include a touch scan signal generation unit 310 generating the touch scan signal provided to the m electrodes 111 of the panel 100 to detect the touch. The touch scan signal may be a voltage signal representing a touch driving voltage, and the touch driving voltage may have a higher voltage value than the common voltage provided to the m electrodes 111 of the panel 100 during the display driving mode. The touch driving voltage may have the same voltage value as the common voltage as a low level voltage value and the higher voltage value than the common voltage as a high level voltage value.

In addition, the touch IC 300 may include a touch sensing unit 320 that receives the touch sensing signals from the m electrodes 111 of the panel 100 according to the touch scan signal and calculate a touch coordinate, thereby detecting the location of the touch input of the user on the panel 100. The calculated touch coordinate is provided to a system unit (not shown) of the display device such that the location on the panel 100 where the user touched the panel 100 can be detected.

The touch IC 300 applies the touch scan signal and receives the touch sensing signals through the display driver IC 200. For instance, the touch scan signal generation unit 310 of the touch IC 300 is connected to the m electrodes 111 through the switching unit 230 of the display driver IC 200 to apply the touch scan signal to the m electrodes 111. The touch sensing unit 320 of the touch IC 300 is connected to the m electrodes 111 through the switching unit 230 of the display driver IC 200 to receive the touch sensing signals.

Although the touch IC 300 of FIGS. 1 and 2 is illustrated as being formed outside the panel 100, the touch IC 300 may be formed in the non-display area 120 of the panel 100 or may be formed in the display driver IC 200.

Hereinafter, various structures of the electrode for the display device with an in-cell type touch screen will be described. FIGS. 3A to 8B are views of enlarging an area "A" of FIG. 1 and show various structures of an electrode for a display device with an in-cell type touch screen according to various embodiments.

Figure 3A:
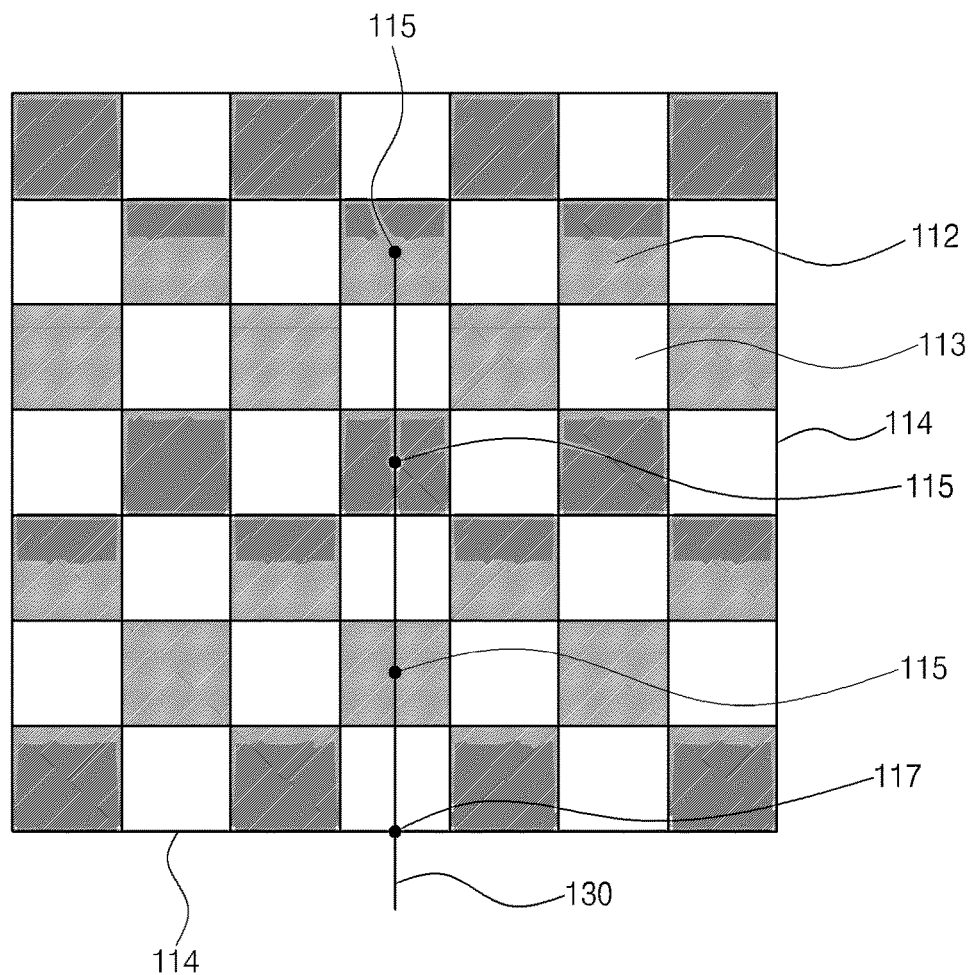
FIGS. 3A through 8B are views showing various structures of electrodes for a display device with an in-cell type touch screen, according to embodiments.

The electrode includes touch electrode portions 112 and non-touch electrode portions 113. The electrode may have a mesh pattern shape. For example, as shown in FIGS. 3A and 3B, the touch electrode portions 112 and the non-touch electrode portions 113 are alternately disposed in first and second directions crossing each other to have a check pattern shape.

The touch electrode portions (or sub-conductive areas) 112 are connected to each other in the signal electrode. The non-touch electrode portions 113 may be connected to each other or may be disconnected in the signal electrode. A contact hole (not shown) is formed in at least one of the touch electrode portions 112 of the electrode, and the touch electrode portions 112 are connected to the line 130 of FIG. 1 through the contact hole. A plurality of contact holes may be formed to connect the touch electrode portions 112 and the line 130. The electrodes of FIG. 3A include edge lines 114 that are conductive. As shown in FIG. 3A, line 130 makes contact at four points of the conductive area of electrode 111 (including at one point 117 contacting the edge lines 114 and other three points 115 contacting conductive areas in the shape of a rectangular tile). The number of contact points is not limiting, and there may be fewer or more contact points. Providing more contact points is generally more advantageous because even when some contact points are not formed during the manufacturing process, other contact points can still connect the conductive area of the electrode 111 to the line 130. In addition, edges of the electrode may be formed around the perimeter of the electrode as shown in FIG. 3A, or edges of the electrode may be formed partially around the perimeter of the electrode as shown in FIG. 3B.

In the present invention, the non-touch electrode portions 113 are formed in the electrode 111, and the initial capacitance of the electrode 111 is decreased compared to another electrode not formed with the non-touch electrode portions 113. Further, an area of the electrode 111 overlapping with the panel or the lines is decreased due to the presence of non-touch electrode portions 113. Due to the lack of edge lines, the initial capacitance of the electrode 111 of FIG. 3B is further reduced compared to the electrode 111 of FIG. 3A. Therefore, the variation between capacitances of the electrode before and after receiving a touch by the user is increased in the electrode 111 of FIG. 3B, which in turn increases touch sensitivity of the electrode 111 of FIG. 3B.

Figure 3B:
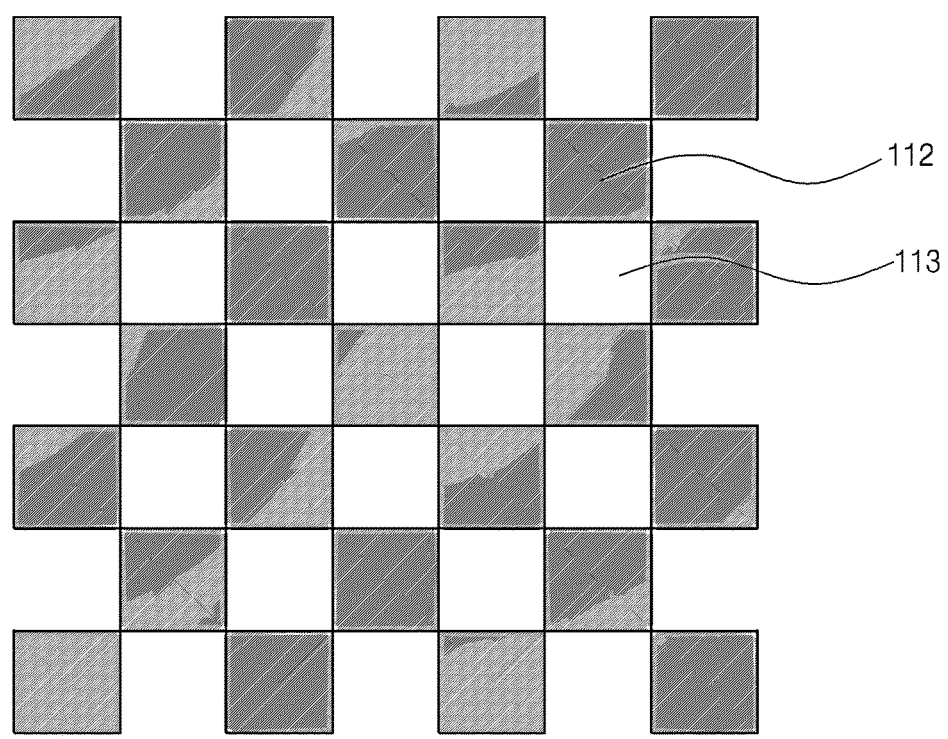

Another advantage of the electrode 111 of FIG. 3B is that interference between adjacent electrode can be reduced. The maximum distance between conductive regions of two adjacent electrodes can be increased, which reduces electrical coupling between the adjacent electrodes. The reduced electrical coupling reduces the interference between the adjacent electrodes.

In some embodiments, the electrode may include openings. For example, as shown in FIGS. 4A through 5B, the electrode may include rectangular openings or circular openings. The openings are non-touch electrode portions 113 where an electrode pattern for touching is not formed, and portions of the electrode excluding the non-touch electrode portions 113 are touch electrode portions 112.

Figure 4A:
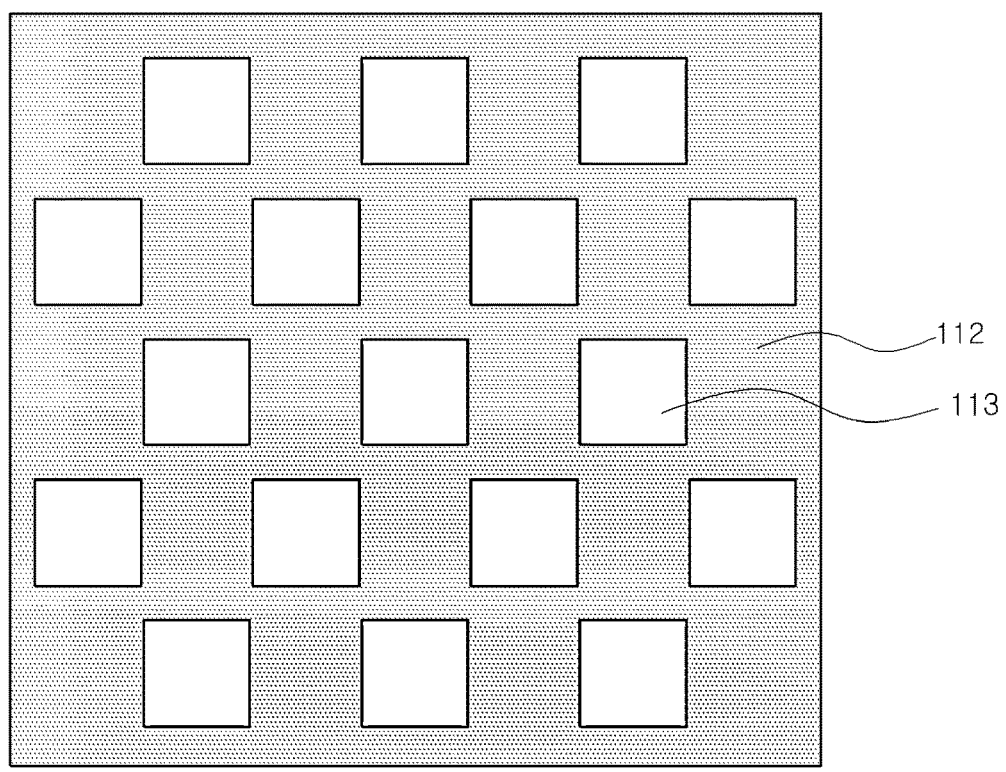
Figure 4B:
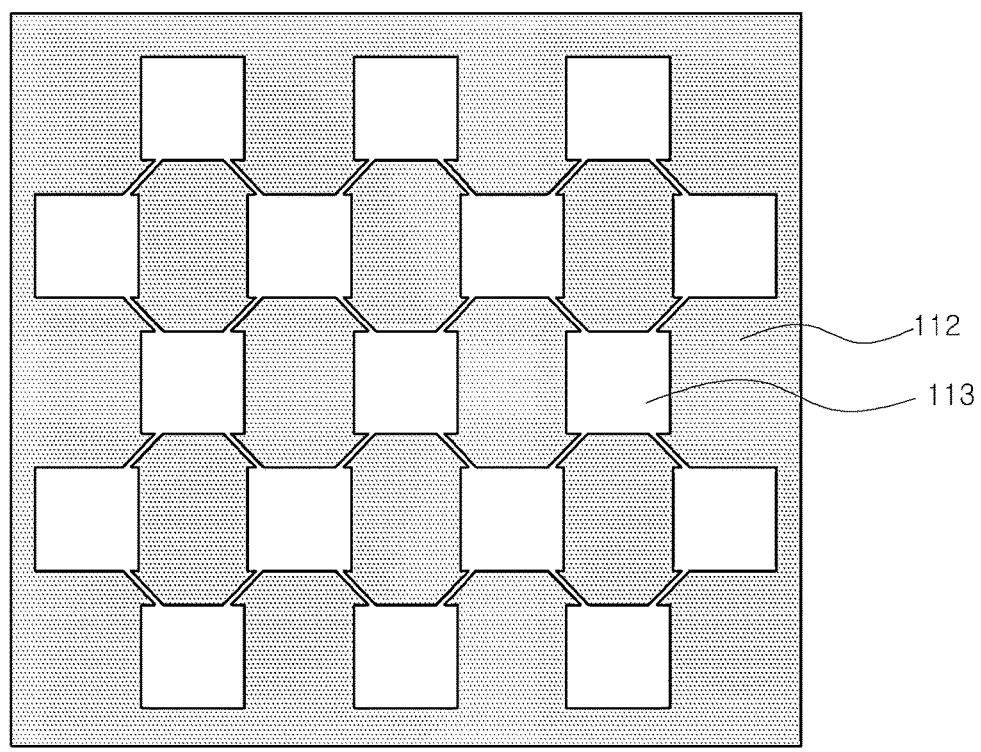
Figure 5A:
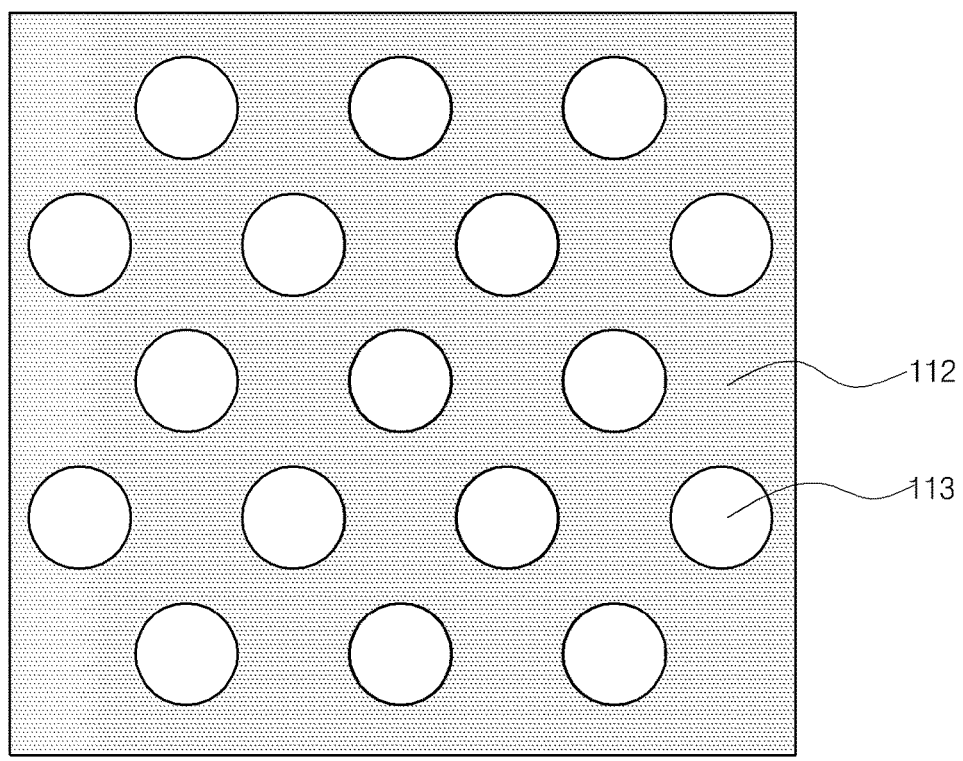
Figure 5B:
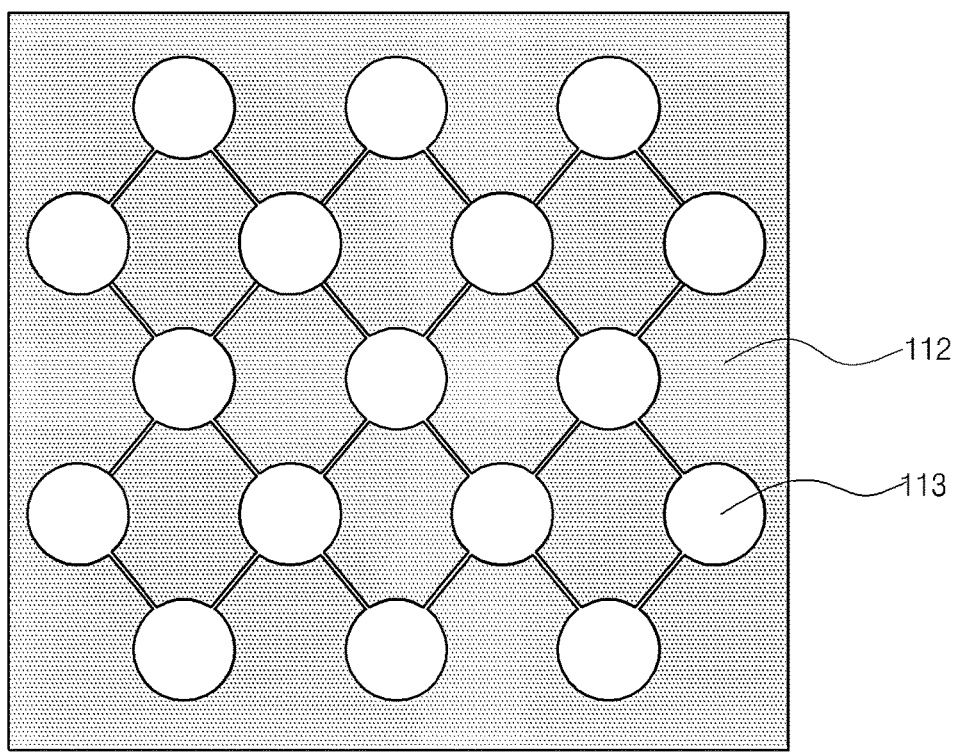

The openings 113 may have polygonal shapes in addition to the rectangular shape or the circular shape. As shown in FIGS. 4A and 5A, the openings 113 may be disconnected and separated in the electrode, or as shown in FIGS. 4B and 5B, the openings 113 may be connected to each other in the electrode.

Figure 6A:
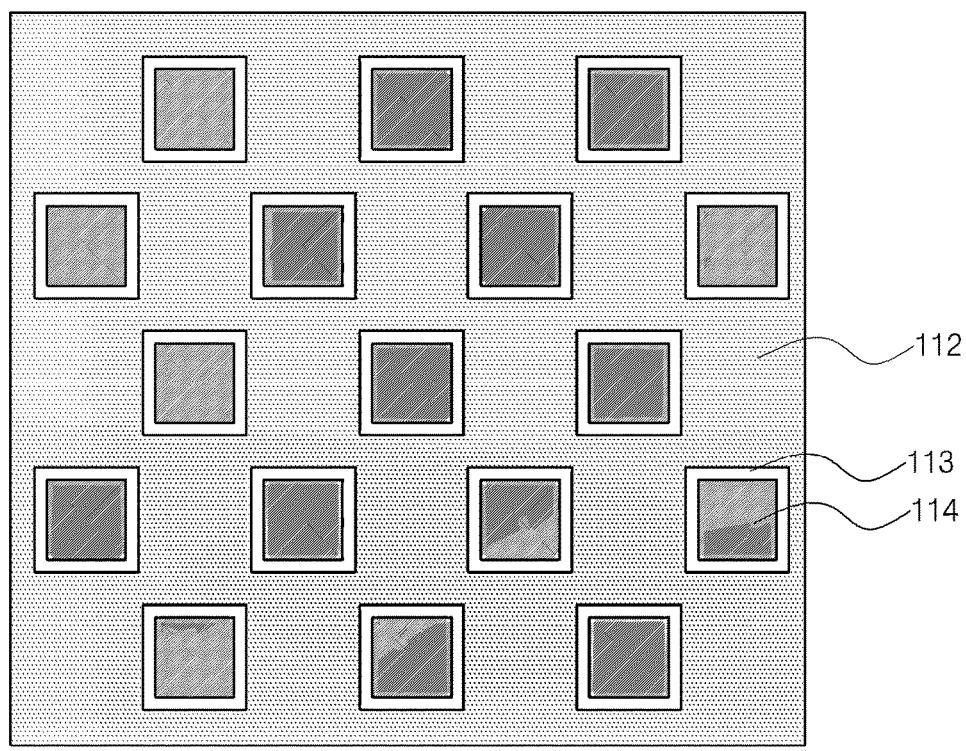
Figure 6B:
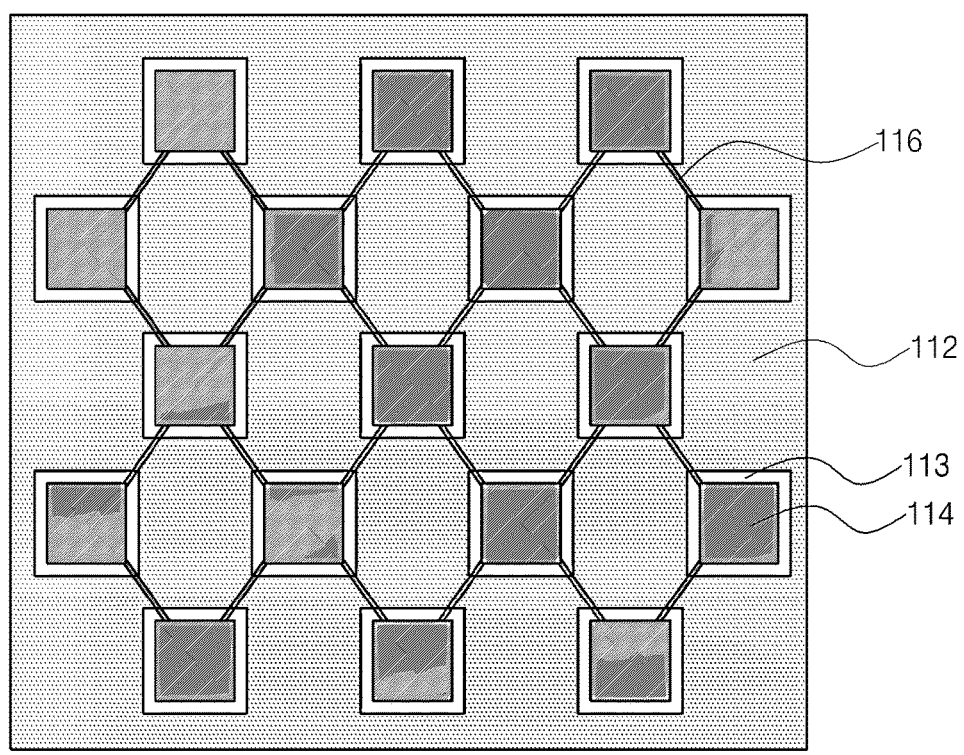
Figure 7A:
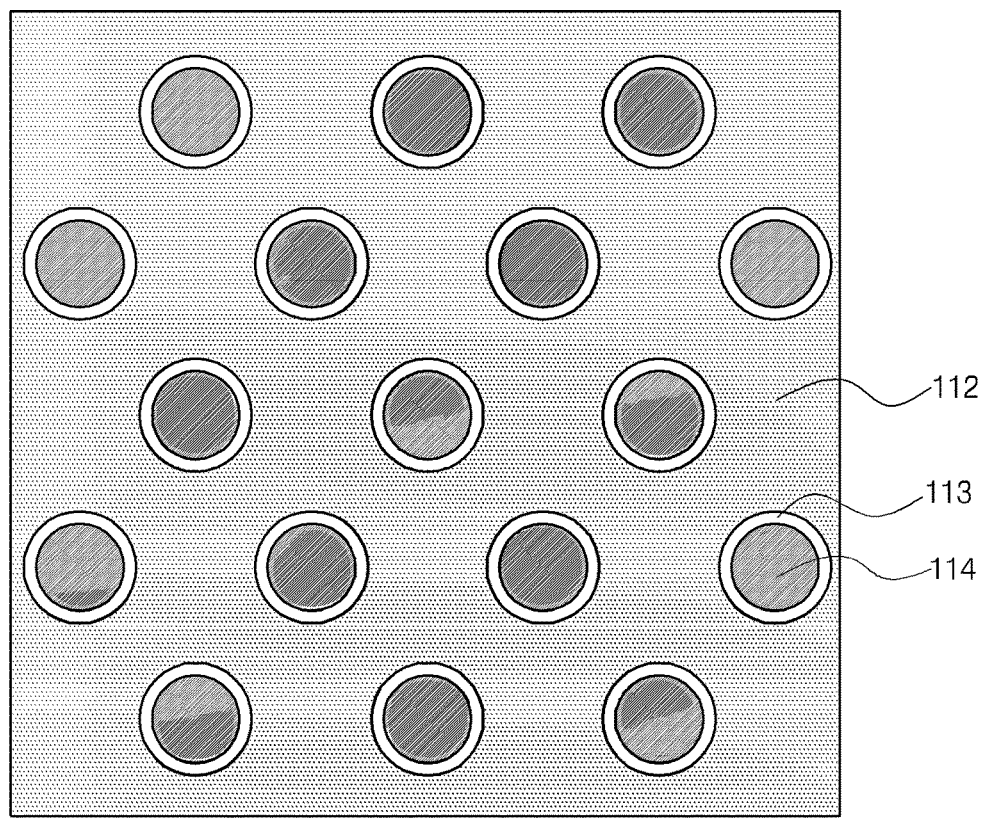
Figure 7B:
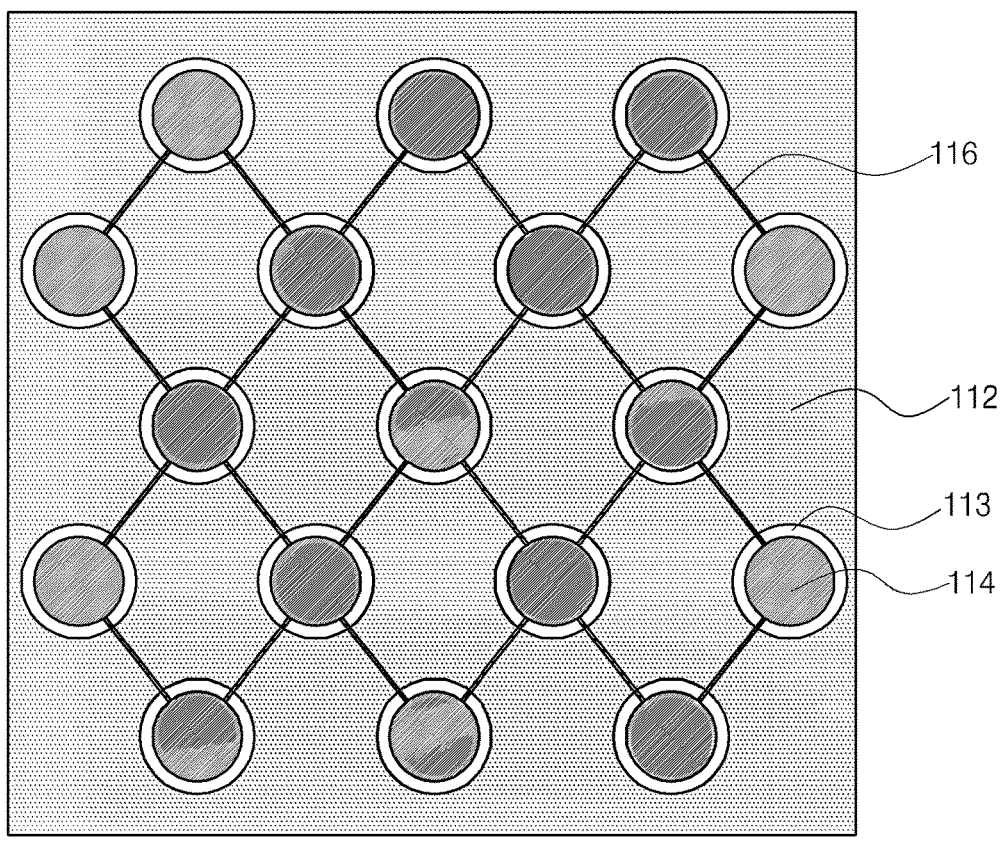

Dummy electrodes may be formed in the openings (i.e., the non-touch electrode portions 113). Dummy electrodes refer to electrodes not connected to other conductive lines (e.g., touch scan signal lines). For example, as shown FIGS. 6A through 7B, dummy electrodes 114 of a rectangular shape or a circular shape may be formed in the non-touch electrode portions 113. The dummy electrodes 114 may have polygonal shapes in addition to the rectangular shape or the circular shape. As shown in FIGS. 6A and 7A, the dummy electrodes 114 may be disconnected and separated from each other in the electrode. Alternatively, the dummy electrodes 114 may be connected to each other in the electrode by bridges 116 as shown in FIGS. 6B and 7B. Further, the dummy electrodes 114 may be connected to the lines but the dummy electrodes 114 may be formed of a material such that the touch scan signal is conducted to the dummy electrodes 114.

Figure 8A:
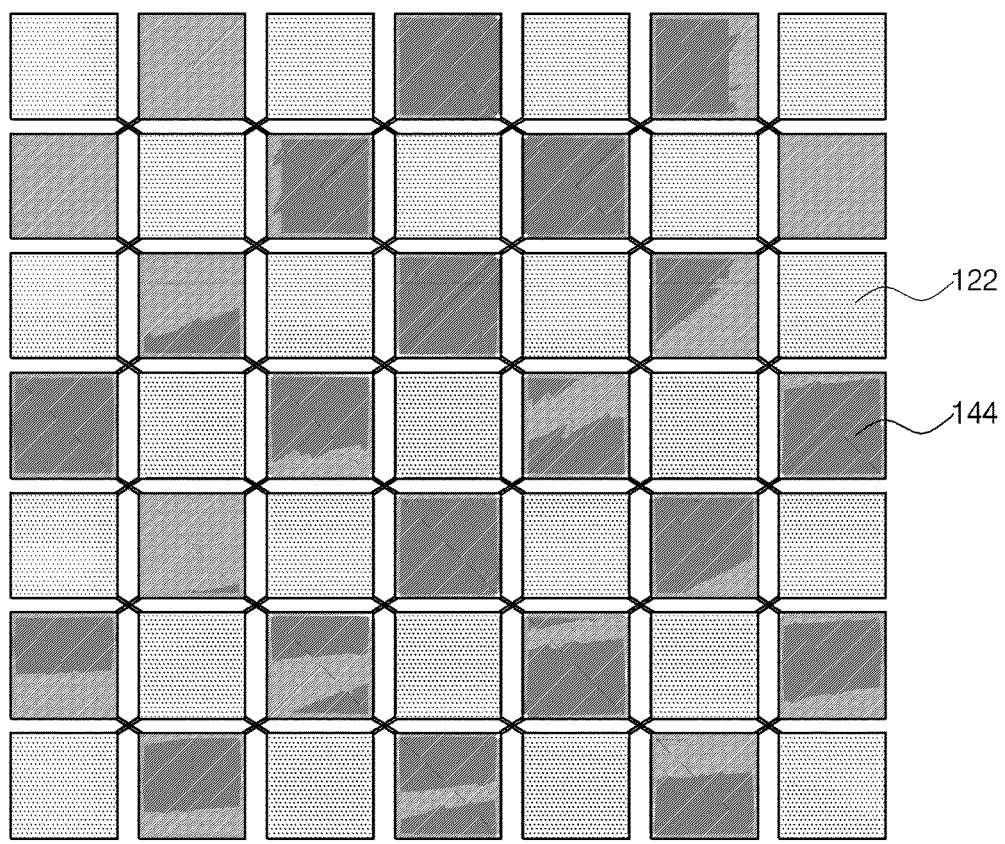
Figure 8B:
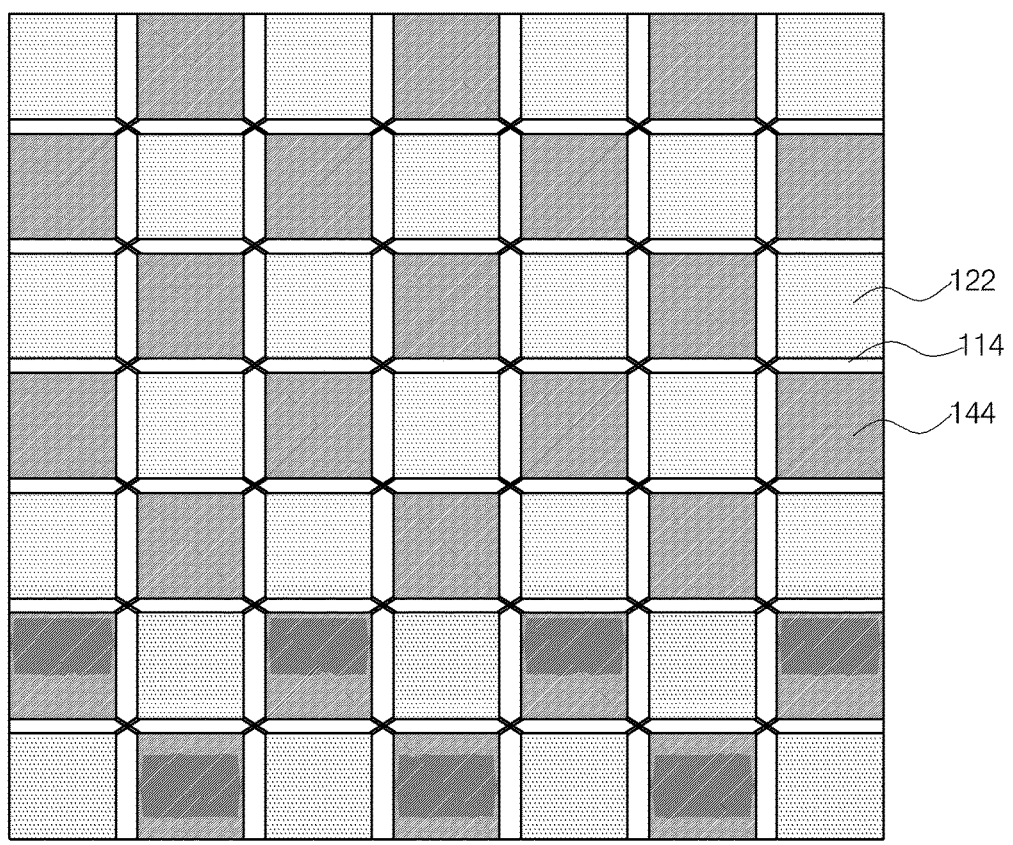

As shown in FIGS. 8A and 8B, touch electrode portions 112 and non-touch electrode portions 113 may be alternately disposed and spaced apart from each other in a check pattern. Dummy electrodes 114 may be formed in the non-touch electrodes portions 113. The touch electrode portions 112 are connected to each other, and the dummy electrodes 114 are also connected to each other. In addition, edges of the electrode may be partially formed as shown in FIG. 8A, and edges of the electrode may be entirely formed as shown in FIG. 8B.

Figure 9:
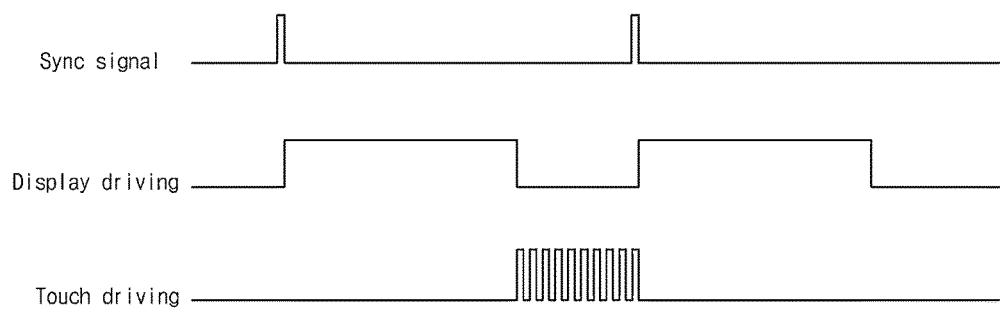
FIG. 9 is a timing diagram of signals of the display device with an in-cell type touch screen for the display driving and the touch driving according to an embodiment.

FIG. 9 is a timing chart of signals of the display device with an in-cell type touch screen for the display driving and the touch driving according to an embodiment of the present invention. In the display driving mode of a frame, the common voltage is applied to the m electrodes. In the touch driving mode of the frame, the touch scan signal is applied to the m electrodes. For example, one frame is divided into a display driving period and a touch driving period. The frame as shown in FIG. 9 is defined by time period between the two vertical synchronization signals. During the display driving period with in a frame, the common voltage is applied to the electrode, and during the touch driving period in the same frame, the touch scan signal is applied to the electrode.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A display device with a touch screen, comprising:
   a panel formed with:
      an array of pixels for generating images,
      a touch surface to receive a touch from a user,
      a plurality of conductive lines, and
      a plurality of electrodes, each of the electrodes having:
         a rectangular conductive area electrically connected to one of the conductive lines, and a plurality of dummy portions in a plurality of openings in the conductive area patterned along a first direction and a second direction perpendicular to the first direction, the dummy portions isolated from the conductive lines and dummy portions in other electrodes, the conductive area of each of the electrodes smaller than an entire area of each of the electrodes; and an integrated circuit configured to provide common voltage signals for operating the pixels to the pixels via the conductive lines and the electrodes in a display driving mode, the integrated circuit further configured to provide touch scan signals for detecting a location of the touch on the touch surface to the electrodes via the conductive lines in a touch driving mode.

2. The display device of claim 1, wherein the electrodes are formed as an array on a display area of the panel and the integrated circuit is attached to a non-display area of the panel.

3. The display device of claim 1, wherein the integrated circuit comprises:

a synchronizing signal generation circuit configured to generate a synchronizing signal indicating either the display driving mode or the touch driving mode;

a common voltage generation circuit configured to generate the common voltage signals; and a switching circuit coupled to the common voltage generation circuit and a touch scan circuit configured to generate the touch scan signals, the switching circuit configured to transmit the common voltage signals or the touch scan signals to the conductive lines according to the synchronizing signal.

4. The display device of claim 1, further comprising a touch scan circuit comprising a touch scan signal generation circuit configured to generate the touch scan signals, and a touch sensing circuit configured to receive the touch sensing signals from the electrodes in response to applying the touch scan signals and detecting the location of the touch input on the panel.

5. The device of claim 4, wherein the touch scan circuit is configured to provide the touch scan signal and receive the touch sensing signals through the integrated circuit.

6. The device of claim 1, wherein each of the openings is rectangular.

7. The device of claim 6, wherein each of the electrodes comprises bridges connecting the dummy portions.

8. The device according to claim 1, wherein the plurality of electrodes includes a first electrode and a second electrode, and wherein the dummy portions in the first electrode are connected to each other, and the dummy portions in the first electrode are isolated from the dummy portions in the second electrode.

* * * * *